Sept. 26, 1939.  E. PERLMAN  2,174,093
RACK FOR GLASS COFFEE BREWERS
Filed Aug. 11, 1937
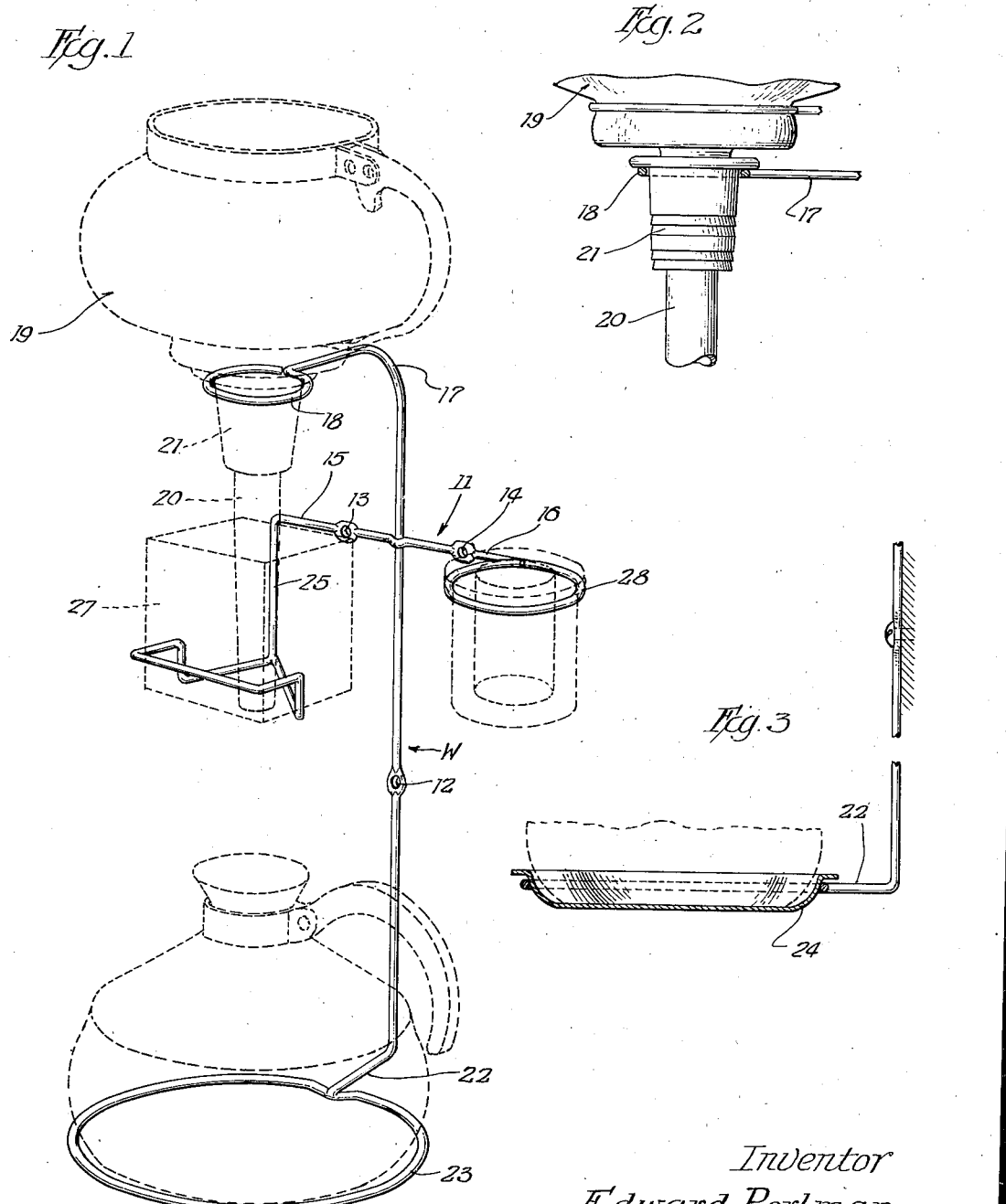
Inventor
Edward Perlman
BY:
Sheridan, Davis & Cargill
Attorneys Patented Sept. 26, 1939

2,174,093

UNITED STATES PATENT OFFICE 2,174,093

RACK FOR GLASS COFFEE BREWERS

Edward Perlman, Niles Center, Ill.

Application August 11, 1937, Serial No. 158,587

1 Claim. (Cl. 65—65)

This invention relates to improvements in racks for glass coffee brewers.

Glass coffee brewers of the vacuum type comprise lower bowls or decanters and upper bowls having funnels which in use extend into the constricted necks of the lower bowls, the funnels being provided with gaskets or stoppels which provide air tight seals. When a brewing operation is completed, the upper bowl of the brewer is removed while the lower bowl is employed generally in serving the coffee. Since the bowls are made of glass and must, therefore, be handled with care to avoid breakage, the temporary disposition of an upper bowl until it is convenient to cleanse the same following a brewing operation frequently is a source of annoyance in a crowded kitchen. If the bowl is laid on a sink drain board, it is likely to roll and be broken while if placed in the sink with other dishes, pots and pans, there is likelihood of chipping or cracking it. If laid on a table the drip from the coffee grounds and the grounds themselves may also be a source of annoyance.

It is an object of the present improvements to provide a simple, inexpensive rack for the bowls and accessories of a glass coffee brewer which not only will support the parts immediately after use but will safely support the same after cleansing until again required for coffee making purposes.

Another object of the invention is to provide a rack for the upper and lower bowls of a glass coffee brewer which supports the bowls independently but in axial alignment whereby, when the bowls are placed on the rack immediately after the completion of a coffee making operation, the drip from the upper bowl will be caught by the lower bowl.

In the embodiment of the invention illustrated, Fig. 1 is a perspective view of an improved rack designed for attachment to a wall;

Fig. 2 is a broken side elevation of an upper supporting member illustrating an upper bowl in position thereon; and Fig. 3 is a similar view of a lower bowl supporting portion of the rack.

The rack selected for the purpose of illustration is formed of wire of suitable gauge and stiffness and of cruciform shape, that is, it comprising an upright member indicated generally by the member 10 and a transverse or horizontal member 11, preferably welded together at the point of intersection. The member 10 has an opening 12 while member 11 has two openings 13 and 14, one in each of the arms 15 and 16, respectively. The opening may be formed, if desired, by suitably looping the wire or as shown, by flattening and punching the wire or by drilling. The openings form convenient means by which the rack can be attached to a support, as to a wall.

The upper end of the member 10 is directed forwardly to form an arm 17 which terminates in a horizontal ring 18 for supporting the upper bowl 19 of a glass coffee brewer. The ring 18 preferably is of such diameter as to accommodate the insertion of the funnel 20 and the stoppel 21 carried thereby to support the bowl in upright position. The lower end of member 10 is likewise directed forwardly to provide an arm 22 which terminates in another horizontal supporting ring 23 of greater diameter which is aligned with the ring 18 whereby the opening of the lower bowl will be in vertical alignment with the funnel 20 of an upper bowl supported in the upper ring.

The lower ring preferably is provided with a removable tray or drip pan 24, shown in Fig. 3 in which the lower bowl is supported against tilting. The tray, as shown in Fig. 3, removably seats in the ring 23 while the bottom of the bowl and the tray cooperate to assure the axial alignment of the bowls.

After brewing coffee, the upper bowl is detached from the lower bowl and inserted in position in the ring 18 where it is retained safely against danger of breakage by the usual kitchen activity. Dripping from the funnel is caught by the drip pan or tray 24 or, if the lower bowl is in place thereon, the drippings from the upper bowl are caught by the vertically aligned lower bowl. The rack thus supports either or both bowls in vertically spaced and aligned relation in positions which are safe, but conveniently accessible for subsequent removal for cleansing or re-use.

The arms 15 and 16 may be provided with supports for coffee brewer accessories if desired. For example, the arm 15 has a downwardly extending portion 25 which terminates in a triangular support 26 for supporting a box or container 27 of unused cloth filters, for example. The arm 16, as illustrated, terminates in a ring 28 for supporting another article such as a flanged receptacle or cup 29 in which a filter may be kept in water during periods when the brewer is not in use. Keeping a filter cloth in fresh water between brewing operations keeps it in a sweet and sanitary condition.

The rack described provides not only a safe and convenient support for the bowls of a coffee brewer in that either bowl may be supported thereby independently of the other, but the provision of the tray 24 of such shape that it seats concentrically in the ring 23 and cooperates with the bottom of the lower bowl to effect centering thereof with respect to the vertical axis of the upper bowl precludes the necessity of adjusting the position of the lower bowl to catch drippings from the upper bowl when both bowls have been placed on their respective supports after the completion of a coffee making operation. In other words, the rings in cooperation with the tray, effect automatic axial alignment of the bowls when placed in the rack.

While a specific embodiment of the invention has been shown and described for the purpose of illustration, it will be apparent that various changes may be made therein without departing from the spirit of the invention.

I claim:

A rack comprising a vertical supporting member having a perforated cross arm adapted to be attached to a vertical surface and provided with integral upper and lower horizontal supporting members for independently supporting in vertically spaced relation the upper and lower bowls of a glass coffee brewer, said upper supporting member being of annular form for receiving the funnel of the upper bowl, said lower supporting member comprising a ring coaxially arranged with respect to the upper supporting member and provided with a tray shaped to effect registration of the opening of the lower bowl therein with the funnel of an upper bowl on said upper supporting member and constituting a drip pan for catching drippings from the funnel of said upper bowl when the lower bowl has been removed therefrom.

EDWARD PERLMAN.